Feb. 12, 1935.  A. D. EITZEN  1,990,477
MULTIPLE PROJECTION APPARATUS
Original Filed Nov. 3, 1930
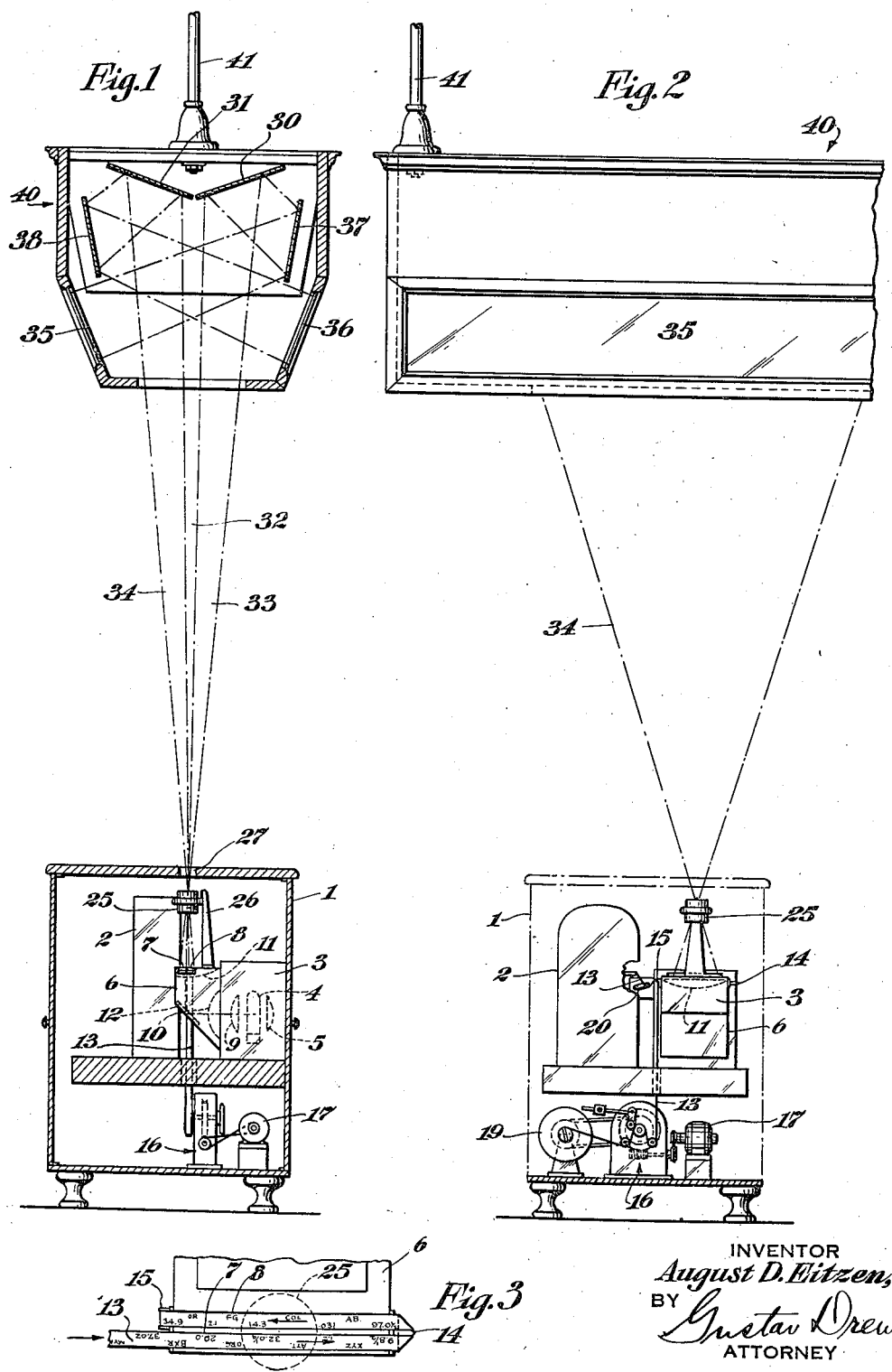
INVENTOR
August D. Eitzen,
BY Gustav Drews
ATTORNEY Patented Feb. 12, 1935

1,990,477

UNITED STATES PATENT OFFICE 1,990,477

MULTIPLE PROJECTION APPARATUS

August D. Eitzen, Rockville Center, N. Y., assignor to News Projection Corporation, New York, N. Y., a corporation of New York Application November 3, 1930, Serial No. 493,036
Renewed May 11, 1933

11 Claims. (Cl. 88—24)

The invention relates to projecting apparatus primarily designed for projecting stock quotation data from a ticker tape upon a screen or screens, but not necessarily limited to such uses.

A principal object is to provide means for projecting the images of two adjacent portions of a printed tape upon different screens, from a single light source and by the use of a single objective (or group of objective lenses) with the principal advantages of simplifying the apparatus and eliminating the cost of an additional objective (or group of objective lenses) as required in certain previous types of multiple projection apparatus.

To these ends the invention provides in combination with a ticker, tape puller and suitable means for guiding or directing the tape (as more fully detailed below), a single light source and a single set of condensing lenses, a single objective (or objective group) through which the complete light beam carrying the images of adjacent tape portions is projected, a plurality—at least two—screens in suitable location, and beams dividing or directing means including deflecting mirrors interposed in the beam, in angular arrangement, and acting, with or without additional deflectors to project the two halves of the beam carrying the two images to the respective screens for observation in different rooms or from different view points.

These and other features, capabilities and advantages of the invention will appear from the subjoined detail description of one specific embodiment thereof illustrated in the accompanying drawing, in which Fig. 1 is a vertical section of apparatus embodying the invention in one form.

Fig. 2 is a left side elevation.

Fig. 3 is a detail in plan showing sufficiently the tape with its guiding means, and arrangement in relation to two adjacent parallel light apertures.

The ticker, projector proper, and tape puller are housed or arranged in a cabinet 1, although the precise location or relative arrangement of these components may be varied greatly. As shown, the ticker or tape printer 2 is supported adjacent the projector 3, in the main housing of which is a lamp 4 with reflector 5. The main housing has an extension 6, on the upper face of which are adjacent, parallel light apertures 7, 8. Suitable condensing lenses are arranged intermediate the lamp and the apertures, including for the present general arrangement, a first condenser 9 and a second condenser 10 aligned and centered at the light axis from the lamp and reflector, and a third condenser 11 having its axis perpendicular to the primary axis passing through lenses 9 and 10. A mirror 12 is supported in the extension 6 to divert the beam from condenser 10 and so through the light apertures.

The tape 13 coming from the ticker is guided over the first light aperture 7 and then passes about an angle-guide 14 at the farther side of the extension housing 6, from which it runs in the opposite direction over the second aperture 8 and is then directed as by a guide 15 downward to the tape puller 16, of any known or suitable type. For the present purpose, the complete pulling apparatus usually includes, as shown, a motor 17 connected to the pulling apparatus proper, 16, and a take-up reel 19 with driving means for winding up the tape. There is also controlling means, as indicated by the follower 20 running on a loop or bend in the tape between the ticker and projector, to control the action of the tape puller, as usual in apparatus of this class.

As so far described, the projector with its lamp, reflector, condensers, light apertures and means or arrangement by which the tape is guided over the adjacent apertures, are substantially as disclosed in my prior application Serial No. 390,371, filed September 4, 1929.

The invention provides for throwing the individual images of the two tape sections corresponding to the two apertures, on different screens, by the use of a single objective (or objective group) in distinction from the means or arrangement shown in said application, in which a portion of the total beam, carrying one of the tape images, is deflected by a mirror and passes through one objective, while the remainder of the beam carrying the other tape image passes through another objective. The invention therefore provides simplification and economy incident to the elimination of one of the objectives.

The single objective, or group of objective lenses carried in the casing 25, is adjustably supported on an arm or bracket 26 extending up from the extension housing 6 and is positioned to receive the total light beam passing through condenser 11 and both of the apertures 7 and 8 and to project the beam (in this instance) upward through an aperture 27 in the top of the cabinet 1 (when a cabinet is employed). In going through the objective the half of the total beam passing through aperture 7 is thrown to the right, as viewed in Fig. 1 and the other half of the beam passing through aperture 8 is thrown to the left.

Beam dividing and deflecting means consisting principally of mirrors 30 and 31 is provided to divide the total beam, or to receive the individual beam portions passing through the respective apertures, and direct them to conveniently located screens, with or without intermediate mirrors or deflectors. The complete deflector and screen arrangement as shown, corresponds to the present particular tape arrangement, in which the tape passes over both apertures in right-side-up position; that is, with the printed characters at the upper face of the tape.

The primary deflectors 30 and 31 are arranged at a suitable relative angle, their meeting line being at a center 32 of the total light beam, so that the deflector 30 receives the beam portion 33 passing through aperture 7 and deflector 31 receives the beam portion 34 passing through aperture 8. The screens 35 and 36 are arranged in convenient positions for observation from different viewpoints or from different rooms. An intermediate deflecting mirror 37 is arranged to divert the beam reflected from mirror 30 to screen 35, and a mirror 38 is arranged to deflect the beam from mirror 31 to screen 36, the angular position of the mirrors 37, 38, and also the primary deflectors 30 and 31, depending on the necessary deflection angles of the beams to throw them upon the screen, located in slightly angular position, as shown, and of course the deflector angles may be varied as necessary in relation to each other and to the screen positions.

The described arrangement, with intermediate reflectors 37, provides the necessary number of reversals of the respective images corresponding to the right-side-up arrangement of the tape as above referred to. If the tape is in inverted position at the apertures (with the printed face downward) the intermediate deflectors 37, 38, may be omitted.

In some cases, as shown, the various deflectors and the screens may be arranged in or upon a cabinet or housing, such as 40, which may be suspended, as by rods 41, from the room ceiling, providing for convenient observation of the two screens from opposite viewpoints; otherwise the primary deflectors 30 and 31 may be supported or arranged in any convenient way in proper relation to the light beam from objective 25 and the screens may be located in other positions, as in apertures in walls of different rooms.

It is obvious that various changes and modifications may be made to the details of construction without departing from the general spirit of the invention as set forth in the appended claims.

I claim:—

1. Projecting apparatus of the class described, comprising means providing adjacent light apertures, means for directing portions of a tape over the apertures successively with the printed matter facing in the same direction but readable one portion from left to right and the other portion from right to left, means for projecting a complete light beam through the apertures, an objective arranged to intercept and direct the total light beam, differently located screens, and deflecting means interposed in the total light beam from the objective and arranged to deflect its portion corresponding to the two apertures to the respective screens.

2. Projecting apparatus of the class described, comprising means providing adjacent light apertures, means for directing portions of a tape over the apertures successively with the printed matter facing in the same direction but readable one portion from left to right and the other portion from right to left, means for projecting a complete light beam through the apertures, an objective arranged to intercept and direct the total light beam, differently located screens, and primary deflectors in angular arrangement and in centered relation to the total light beam from the objective and serving to deflect portions of the beam corresponding to the two apertures to the respective screens.

3. Projecting apparatus of the class described, comprising means providing adjacent light apertures, means for directing portions of a tape over the apertures successively with the printed matter facing in the same direction but readable one portion from left to right and the other portion from right to left, a lamp, means including a single set of condensing lenses and a deflector for projecting a complete light beam from the lamp through both apertures, an objective arranged to intercept and direct the total light beam, differently located screens, and deflecting means interposed in the total light beam from the objective and arranged to deflect its portions corresponding to the two apertures to the respective screens.

4. Projecting apparatus of the class described comprising, a tape puller, a projector including a lamp, adjacent parallel light apertures, and condensing lenses for directing the light beam from the lamp through the apertures, a tape puller and means for directing the tape successively over the two apertures with the printed matter facing in the same direction but readable with the portion located on one aperture from left to right and the portion located on the other aperture from right to left and to the tape puller, an objective arranged to receive the total light beam from the apertures, substantially oppositely located screens, and beam dividing and deflecting means comprising primary deflectors arranged at a relative angle and in centered relation to the axis of the complete light beam, and also arranged to deflect the individual beams corresponding to the two apertures to the respective screens.

5. Projecting apparatus of the class described, comprising means providing adjacent light apertures, means for directing portions of a tape over the apertures successively with the printed matter facing in the same direction but readable one portion from left to right and the other portion from right to left, means for projecting a complete light beam through the apertures, an objective arranged to intercept and direct the total light beam, differently located screens, deflecting means interposed in the total light beam from the objective and arranged to deflect its portions corresponding to the two apertures to the respective screens, and intermediate deflectors arranged between said deflecting means and the screens.

6. Projecting apparatus of the class described, comprising means providing adjacent light apertures, means for directing portions of a tape over the apertures successively with the printed matter facing in the same direction but readable one portion from left to right and the other portion from right to left, means for projecting a complete light beam through the apertures, an objective arranged to intercept and direct the total light beam, differently located screens, primary deflectors in angular arrangement and in centered relation to the total light beam from the objective and serving to deflect portions of the beam corresponding to the two apertures to the respective screens, and intermediate deflectors arranged between the primary deflectors and the screens.

7. In a stock quotation projecting machine, the combination with a narrow tape having longitudinally extending reading matter thereon, of two parallel elongated adjacent light apertures, means for drawing said tape successively across said light apertures with the reading matter facing in the same direction but readable from left to right when disposed on one aperture and readable from right to left when disposed on the other light aperture, means for projecting a complete light beam through said adjacent light apertures, an objective arranged to intercept and direct the total light beam after passing through said light apertures and tape portions, two screens facing in opposite directions and parallel to said light apertures, and beam dividing and deflecting means comprising primary deflectors arranged at a relative angle and in centered relation to the axis of the complete light beam and also arranged to deflect the individual beams corresponding to the two apertures to the respective screens.

8. In a stock quotation projecting machine, the combination with a narrow tape having longitudinally extending reading matter thereon, of two parallel elongated adjacent light apertures, means for drawing said tape successively across said light apertures with the reading matter facing in the same direction but readable from left to right when disposed on one aperture and readable from right to left when disposed on the other light aperture, means for projecting a complete light beam through said adjacent light apertures, an objective arranged to intercept and direct the total light beam after passing through said light apertures and tape portions, two screens facing in opposite directions, one for each of said light apertures and disposed above the same, primary deflectors in angular arrangement and in centered relation to the total light beam and also arranged to segregate the individual beams corresponding to the two apertures, and intermediate deflectors arranged between said primary deflectors and said screens to direct the corresponding light beams from said primary deflectors to said screens.

9. Projecting apparatus of the class described comprising means providing a plurality of adjacent light apertures, means for directing portions of a tape over said apertures successively with the printed matter facing in the same direction but readable in different directions, means for projecting a complete light beam through the apertures, an objective arranged to intercept and direct the total light beam, differently located screens, one screen for each light aperture, and deflecting means interposed in the total light beam from the objective and arranged to deflect portions corresponding to the apertures to their respective screens.

10. Projecting apparatus of the class described comprising means providing two adjacent light apertures positioned to receive a complete light beam, means for pulling successive portions of a marked tape across said light apertures, condensing lens means positioned relative to said apertures for projecting a complete light beam through the two apertures whether the tape is moving or at rest to emerge from said light apertures as converging light beam portions, an objective arranged and positioned relative to said light apertures to intercept and direct the total converging light beam portions coming from said apertures, two differently located screens, one screen for each light aperture, and deflecting means interposed in the total light beam portions coming from the objective and deflecting portions of the light beam corresponding to the apertures to their respective screens.

11. In a stock quotation projecting machine, the combination with a narrow tape having longitudinally extending reading matter thereon, of two screens facing into two different inspection areas, a tape feed, a projector including a common source of light for directing a main light beam through the tape both when being fed by said tape feed and when at rest to produce images of the markings on the tape, a single objective positioned for receiving and enlarging the images so produced, and two deflecting means for receiving and splitting said main light beam and the images carried thereby into two subordinate image carrying light beams, each deflecting means directing the images received thereby onto one of said screens.

AUGUST D. EITZEN.